United States Patent
Wagle et al.

(10) Patent No.: US 9,697,048 B2
(45) Date of Patent: Jul. 4, 2017

(54) NON-UNIFORM MEMORY ACCESS (NUMA) DATABASE MANAGEMENT SYSTEM

(71) Applicant: SAP SE, Walldorf (DE)

(72) Inventors: Mehul Wagle, Pune (IN); Daniel Booss, Wiesloch (DE); Ivan Schreter, Mannheim (DE)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 14/830,874

(22) Filed: Aug. 20, 2015

(65) Prior Publication Data

US 2017/0031718 A1    Feb. 2, 2017

(51) Int. Cl.
G06F 9/46     (2006.01)
G06F 9/50     (2006.01)
G06F 12/109   (2016.01)
G06F 12/14    (2006.01)

(52) U.S. Cl.
CPC .......... *G06F 9/5016* (2013.01); *G06F 12/109* (2013.01); *G06F 12/1458* (2013.01); *G06F 2212/1052* (2013.01); *G06F 2212/152* (2013.01)

(58) Field of Classification Search
None
See application file for complete search history.

(56) References Cited

U.S. PATENT DOCUMENTS

| | | | | |
|---|---|---|---|---|
| 6,182,089 B1* | 1/2001 | Ganapathy | ............ | G06F 12/023 |
| 7,380,039 B2* | 5/2008 | Miloushev | ............ | G06F 9/5016 710/244 |
| 7,596,788 B1* | 9/2009 | Shpigelman | .......... | G06F 9/4881 718/100 |
| 2002/0016892 A1* | 2/2002 | Zalewski | .............. | G06F 9/5077 711/153 |
| 2002/0129115 A1* | 9/2002 | Noordergraaf | .......... | G06F 12/08 709/213 |
| 2006/0206489 A1* | 9/2006 | Finnie | .................... | G06F 9/5061 |
| 2007/0291778 A1* | 12/2007 | Huang | .................. | H04L 1/1614 370/410 |
| 2008/0022286 A1* | 1/2008 | Chung | .................. | G06F 9/5016 718/104 |
| 2010/0211756 A1* | 8/2010 | Kaminski | ............. | G06F 12/023 711/172 |
| 2014/0237197 A1* | 8/2014 | Gray | ....................... | G06F 3/061 711/153 |
| 2015/0052287 A1* | 2/2015 | Venkatasubramanian | | G06F 9/5033 711/6 |

\* cited by examiner

*Primary Examiner* — Kenneth Tang
(74) *Attorney, Agent, or Firm* — Sterne, Kessler, Goldstein & Fox P.L.L.C.

(57) ABSTRACT

Disclosed herein are system, method, and computer program product embodiments for managing non-uniform memory access (NUMA) in a database management system. An embodiment operates by receiving a request to load data from a disk into an in-memory database. An optimal one of the plurality of nodes onto which to load the data from the disk based on a system state is determined. It is determined whether the optimal node has sufficient free local memory in a free list to store the data. If the optimal node does not have sufficient free list memory, a memory allocation is requested from an operating system. An address of the memory storing the data is provided.

19 Claims, 3 Drawing Sheets

US 9,697,048 B2

NON-UNIFORM MEMORY ACCESS (NUMA) DATABASE MANAGEMENT SYSTEM

BACKGROUND

In symmetric multiprocessing database systems, a single memory controller is shared by a number of central processing units (CPUs). Communications with the shared memory controller can cause congestion when there are multiple simultaneous accesses to the memory. To address this problem, non-uniform memory access (NUMA) systems were developed. However in a NUMA database system if the data is not properly distributed amongst the CPUs, the system may nonetheless become congested, leading to unacceptable latency in the accessing of data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for managing memory access in a NUMA database system.

Figure 1:
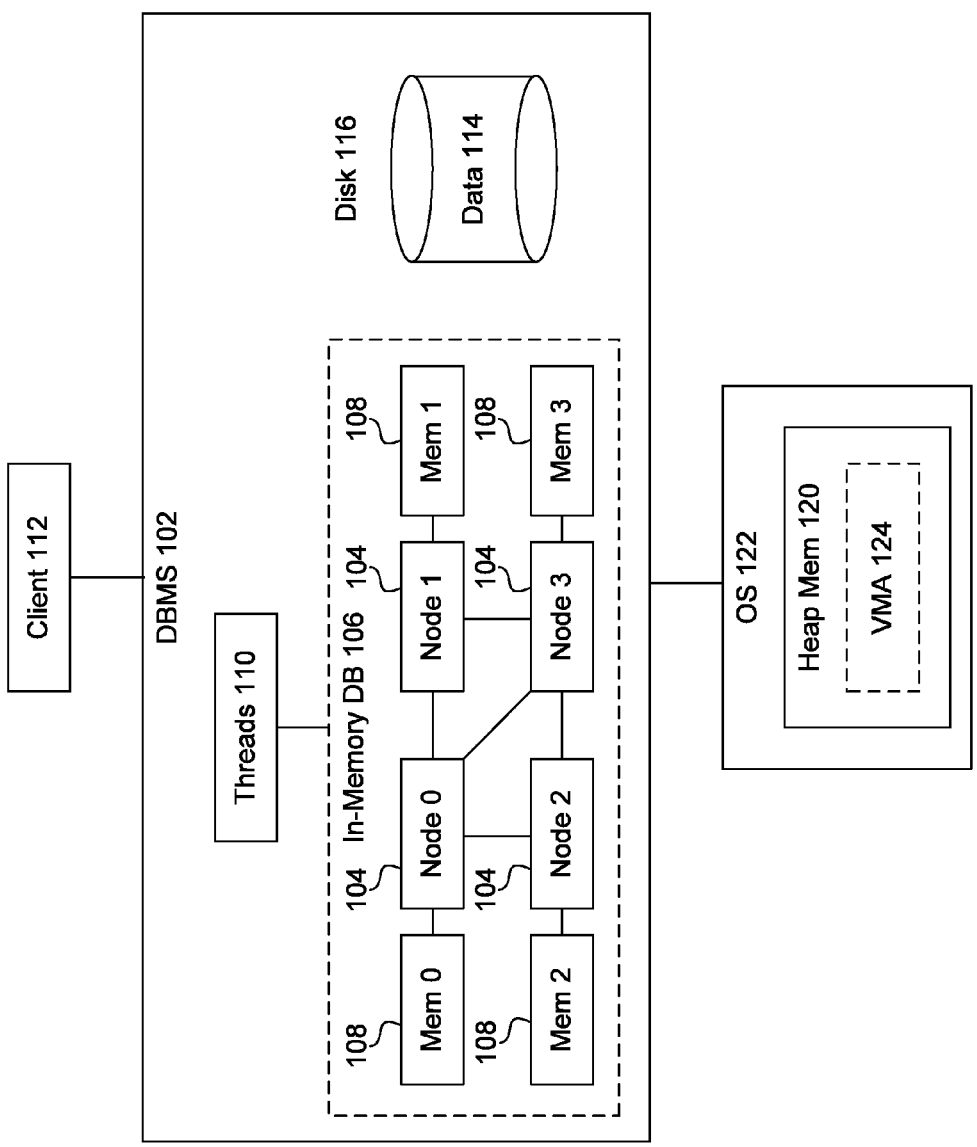
FIG. 1 is a block diagram of a non-uniform memory access (NUMA) database management system, according to an embodiment.

FIG. 1 is a block diagram 100 of a non-uniform memory access (NUMA) database management system, according to an embodiment. A database management system (DBMS) 102 may include a plurality of nodes 104 comprising an in-memory database 106. The nodes 104 of in-memory database 106 may be distributed within one or more machines or computers, or over diverse geographic areas.

Nodes 104 may include one or more processors, local memory 108, and a connection to one or more other nodes 104 of in-memory database 106. Each node 104 may have its own local memory 108 that is directly accessible via a high-speed bus or other connection. Additionally, the nodes 104 may access the memory 108 of one or more other nodes 104 through one or more interconnects.

An interconnect may be a connection or communication pathway between two or more nodes 104, enabling the nodes to communicate with one another including accessing the memories 108 of other nodes. For example, Node 0 may have access to both local memory 0, as well as remote memory 1. Memory 1 may be considered local memory to Node 1, and remote memory to any other nodes accessing memory 1, including Node 0. Remote memory 108 may be any memory that is accessible via a connection through one or more additional nodes 104 other than its local node 104.

In an embodiment, in a symmetric multiprocessing (SMP) system, a computer has a single memory that is shared by all the central processing units (CPUs) of the computer. However, simultaneous communication or attempts to this shared resource memory could cause congestion in the computer. This congestion could lead to unacceptable processing delays in the SMP system.

In an embodiment, nodes 104 of in-memory database 106, by contrast, may have a non-uniform memory access (NUMA) arrangement. In an example NUMA, as referenced above, the nodes 104 have access both to their own local memory 108, as well as the local memory 108 of other nodes 104 (via interconnects between two or more nodes 104). This dual memory access may alleviate, at least in part, the congestion problem of SMP systems. In an embodiment, in a NUMA system, the memories 108 of nodes 104 may be accessed with varying frequency or concurrency. For example, the memory 108 of a first node 1 may be accessed more or less frequently, or with more or fewer concurrent thread access requests, than the memory 108 of a second node 2.

However, the placement or allocation of application data amongst the memory 108 of the nodes 104 may cause or prevent, avoid, or otherwise reduce or minimize unnecessary congestion in a NUMA system.

Improper allocation of data to the memories 108 may cause congestion similar to that found in a SMP system. If a large portion of the data that is accessed by one or more clients 112 or threads 110 is stored in one or two memory units 108, congestion may still occur in a NUMA system. For example, DBMS 102 may have a plurality of threads 110 that perform data access (read and/or writes) to the data stored in the memories 108 of the nodes 104. If too many threads 110 are accessing the data stored on a particular node 104, then the latency in accessing the data may increase and cause undesirable delays in data processing. This may occur, for example, if the system state is not considered when performing data allocation. Without accounting for current system state, data may be loaded onto a node that is already being accessed by a large number of threads, thereby increasing database latency.

Proper allocation of data to the memories 108 may, however, alleviate congestion. For example, DBMS 102 may account for a system state prior to allocating data to one or more memories 108 of the nodes 104. DBMS 102 may, for example, monitor a load (e.g., number or volume of thread 110 accesses) of nodes 104, and may be able to determine which nodes 104 have a heavy load or a light load relative to other nodes 104. DBMS 102 may also, for example, account for the amount of free memory available in a node 104 prior to determining whether or not the node 104 is to be allocated additional data 114.

For example, DBMS 102 may receive a request from a client 112 for data 114. DBMS 102 may determine that data 114 does not exist within the in-memory database 106 (e.g., in the memory 108 of any of the nodes 104). DBMS 102 may then need to load data 114 from a disk 116 into one or more memories 108. Or, for example, client 112 may request that data 114 be loaded into in-memory database 106 from disk 116.

Disk 116 may be a tape drive, hard drive disk, or other storage that requires greater resources (including, but not limited to time) by which to perform data access. For example, data stored in memory 108 may be accessed more quickly than data 114 when stored in disk 116.

In an embodiment, when data needs to be loaded into memory from a disk, a system that does not account for system state uses a dedicated allocator for each processor of a node to manage the allocation requests of threads executing only that processor. Also, the memory of the node is partitioned amongst the various CPUs (processors) operating on the node, thus avoiding expensive synchronization mechanisms required for multi-threaded applications, however leaving open the possibility of underutilized memory. If a thread, in such a system, needs to allocate a few chunks of memory (e.g., for inserts into a table), the memory manager of that core or processor services that request.

In an embodiment, each allocator may have a sub-allocator that handles the memory allocation for the processor depending on the size of the request. For example and without limitation, a small allocator may handle requests for sizes <=4 KB, a medium allocator may handle requests <=32 KB, big allocator may handle requests up to 256 MB, and a huge allocator may handle requests larger than 256 MB. The big allocator may borrow memory from other nodes; the huge allocator may request data from an operating system memory heap. The problem with this type of system however is that there is no guarantee that the allocated memory will live or be bound to the node of the executing thread that needs access to the data. The reason is that this system uses a "first touch" binding system, in which the data page(s) are bound to whatever threads first access them after being requested, not necessarily the thread that requested the data be loaded. These systems do not account for system state, and the allocation of data may result in unnecessary congestion or long access delays (e.g., if data is allocated to a node at a large distance from a client that needs access or repeated access to that data).

In the example embodiment of FIG. 1, by contrast, client 112 may request from DBMS 102 the identifier of a node 104 into which to load data 114. For example, client 112 may query DBMS 102 for one or more nodes 104 that would be ideal or preferred for data 114 that needs to be accessed by client 112 based on a current system state.

In an embodiment, DBMS 102 may determine the workload of the nodes 104, and relative distances from client 112 to determine an optimal node(s) 104 onto which to load data 114. The optimal node may be any one of the nodes 104 selected as an ideal or most efficient node onto which to load the data 114 based on the system state or workload. In an embodiment, DBMS 102 may also provide a secondary or next optimal node 104 onto which to load data 114, in case the primary node 104 is unable to accommodate data 114. For example, the optimal node 104 may not have enough free memory 108.

Rather than using the first touch allocation method used by other systems, DBMS 102 uses a preferred method of allocation by which one or more nodes 104 are indicated as ideal locations to identify into which memory 108 data 114 should be stored. These optimal node(s) 104 may be provided by way of a bitmap in which one or more bits are set, the set bits corresponding to the one or more optimal nodes 104. In an embodiment, the smallest number node (e.g., the node 104 corresponding to the smallest set bit(s)) may be the node 104 of the highest preference. If that node 104 is unavailable, then the next optimal node 104 may be checked. In an embodiment, the bitmap may indicate any number of optimal nodes 104.

This bitmap request may be provided to DBMS 102 by client 112 and/or one or more threads 110. In an embodiment, the request may include an indication of the size of memory 108 necessary, the size indication corresponding to the size of data 114. DBMS 102 may check the a free list of the optimal node 104 to see if there is enough available memory 108 in the free list in which to store data 114 locally to the optimal node 104. The free list may be a portion of a local memory 108 that is allocated or has been previously allocated for use by a particular application or process associated with data 114 and/or client 112. Data 114 may be a table of a database, record, row, or column, or any other data of a database. If the optimal node 104 has available free memory (e.g., cache memory) in the free list, then data 114 may be loaded into the free list (e.g., previously allocated portion of memory 108) of the optimal node 104.

If, however, there is not enough memory available memory in the free list of the optimal node, a call may be made to the operating system 122 for heap memory 120. Heap memory 120 may include local memory 108 (e.g., non-free list memory) of a node 104, or memory 108 of one or more other nodes 104. The call to the operating system (OS) 122 may be to request additional heap memory 120 into which data 114 may be stored. This call however may be expensive in terms of the time it takes or resources necessary to make or process the call, and thus if other options are available, the DBMS 102 may prefer them over making OS calls.

To avoid expensive system calls when interacting with the OS 122, a third-party library, such as libnuma may be used to interact with a NUMA system such as in-memory DB 106. The use of libnuma by DBMS 102 however may have been optimized over conventional use of libnuma. For example, a conventional libnuma API (application programming interface) by which to allocate memory from a NUMA node is numa_alloc_on_node (<size>, <node>). This conventional API however implements a strict binding policy that may create issues, particularly in low memory situations. In these situations, there may be heavy swapping of memory pages to disk or some processes may be killed by an OS daemon. This may create both reliability and performance issues. Instead, the DBMS 102 may use a modified API using a preferred binding policy (instead of strict) to implement NUMA-aware allocations with node level binding to client threads. In an embodiment, the low memory or out of memory preferred binding policy may include one or more fallback mechanisms as described herein that solve the reliability and performance issues associated with conventional use of the API.

In an embodiment, if DBMS 102 requests additional heap memory 120 from operating system 122, DBMS 102 may request memory of a certain size corresponding to the size of data 114 to be loaded. OS 122 may then allocate a corresponding or larger size of heap memory 120 to the identified or optimal node 104 for the storage of data 114. This is different from the first touch system, in which it is unclear to which node allocated heap data is to be bound until the data is sought to be accessed. For example, OS 122 may check the memory 0 (non-free list memory) of node 0 (e.g., if node 0 is an optimal node 104) to determine if there is available memory to which to allocate to the free list of node 0 for storage of the data 114.

Data 114 may then be stored into a portion of heap memory 120 if there is enough available local memory at the preferred or optimal node (e.g., node 0). If however the memory 0 of node 0 is running low or is out-of-memory, the OS 122 may seek allocation of memory 108 from one or more other nodes 104 of in-memory database 106. The OS 122 may, for example, check the free lists and/or non-free list memories 104 of one or more other nodes 104 to determine which has enough available space for data 114. Once a node 104 is identified, a portion of that memory or free list may be allocated for storage of data 114.

In an allocation of heap memory 120, the newly allocated memory portion may be assigned a virtual memory address (VMA) 124, and the VMA 124 may be returned to (e.g., bound to) the optimal node 104. The optimal node 104 may include a pointer to the VMA 124, and the address to the pointer may be provided to client 112. The remaining portion of the heap memory 120 may then be available on the free list for access by other nodes 104.

In an embodiment, this allocation of heap memory 120 to one or more optimal node(s) 104 may be done by way of one or more application programming interfaces (APIs) of libnuma or another library. For example, by way of invoking an API, client 112 may be able to provide one or more parameters to DBMS 102 indicating the optimal node(s) 104 to which to allocate data 114. Or, for example, invoking one or more API functions, DBMS 102 may be able to identify the system state and determine which node(s) are preferred.

Figure 2:
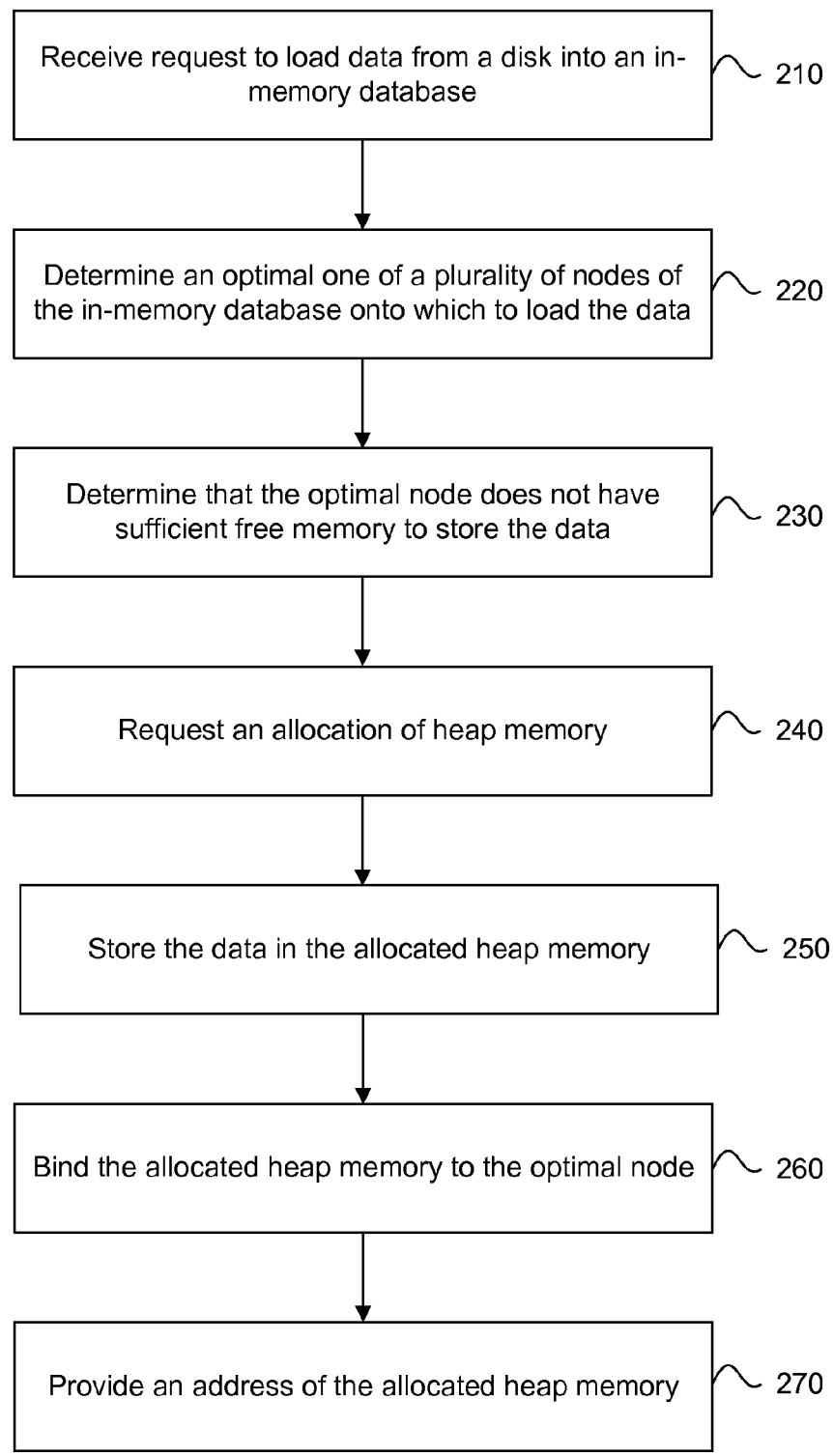
FIG. 2 is a flowchart illustrating a process for managing non-uniform memory access (NUMA) in a database management system, according to an example embodiment.

FIG. 2 is a flowchart illustrating a process 200 for managing non-uniform memory access (NUMA) in a database management system, according to an example embodiment. Process 200 can be performed by processing logic that can comprise hardware (e.g., circuitry, dedicated logic, programmable logic, microcode, etc.), software (e.g., instructions run on a processing device), or a combination thereof At step 210, a request to load data from a disk or other storage device into an in-memory database is received. For example, DBMS 102 may receive a request from client 112 to access data 114. Data 114 may be a table, or a portion of data stored on disk 116 that may be added to in-memory database 106 to allow access by one or more clients 112. In an embodiment, data 114 may replace an existing portion of data from in-memory database 106.

At step 220, a preferred one of the plurality of nodes onto which to load the data from the disk based on a system state is determined. For example, DBMS 102 may determine, based on a system state or workload of the nodes 104 and location of client 112 which node(s) 104 may be preferred to optimize or otherwise improve access and reduce access latency in data access of in-memory database 106. The workload may correspond to a number and/or frequency of threads 110 from one or more of the nodes 104 that are accessing a particularly memory 108. In an embodiment, the determination of the optimal node 104 may account for free memory 108 locally available to the nodes 104.

At step 230, it is determined whether the optimal node has sufficient free (available) memory to store the data. For example, memory 108 of the optimal node 104 may have a first portion (e.g., free list) allocated for use with an application associated with data 114, and a second portion that is used for other applications and/or processes. The first portion or free list may be checked to determine if there is enough memory to store the data 114. If there is available memory in the free list, then the data 114 may be stored in the free list of the optimal node 112. However, the free list of memory 108 may be full or may otherwise not have enough space to store data 114. If the optimal node does not have sufficient free list memory to store the data 114, then step 240 is performed.

At step 240, an allocation of heap memory to be allocated to the optimal node is requested. For example, DBMS 102 may make a call to operating system 122 requesting access to or an allocation of a portion of heap memory 120 into which data 114 may be stored. The allocation from heap memory 120 may include an allocation from the memory 108 of the optimal node 104 if there is enough free space in the memory portion. If however, there is a low memory or out-of-memory condition, the OS 122 may allocate a portion of memory (e.g., free list or non-free list) from another node 104 for storage of the data 114.

At step 250, the data is stored in the allocated heap memory. For example, data 114 may be stored in heap memory 120.

At step 260, the allocated heap memory is bound to the optimal node. For example, rather than binding the allocated heap memory to the first node 104 or node associated with the first thread 110 requesting access to data 114 as stored in heap memory 120, heap memory 120 may be bound to the previously identified optimal node 104. This binding may occur independent of which thread 110 requests access to the stored in-memory data 114.

At step 270, an address of the allocated heap memory by which the data is accessed is provided. For example, the stored heap data 114 and/or the allocated portion of heap memory 120 may be associated with or otherwise correspond to a virtual memory address (VMA) 124. Then, upon binding, the VMA 124 may be associated with the optimal node 104, and may be provided to the client 112 requesting access to data 114.

Figure 3:
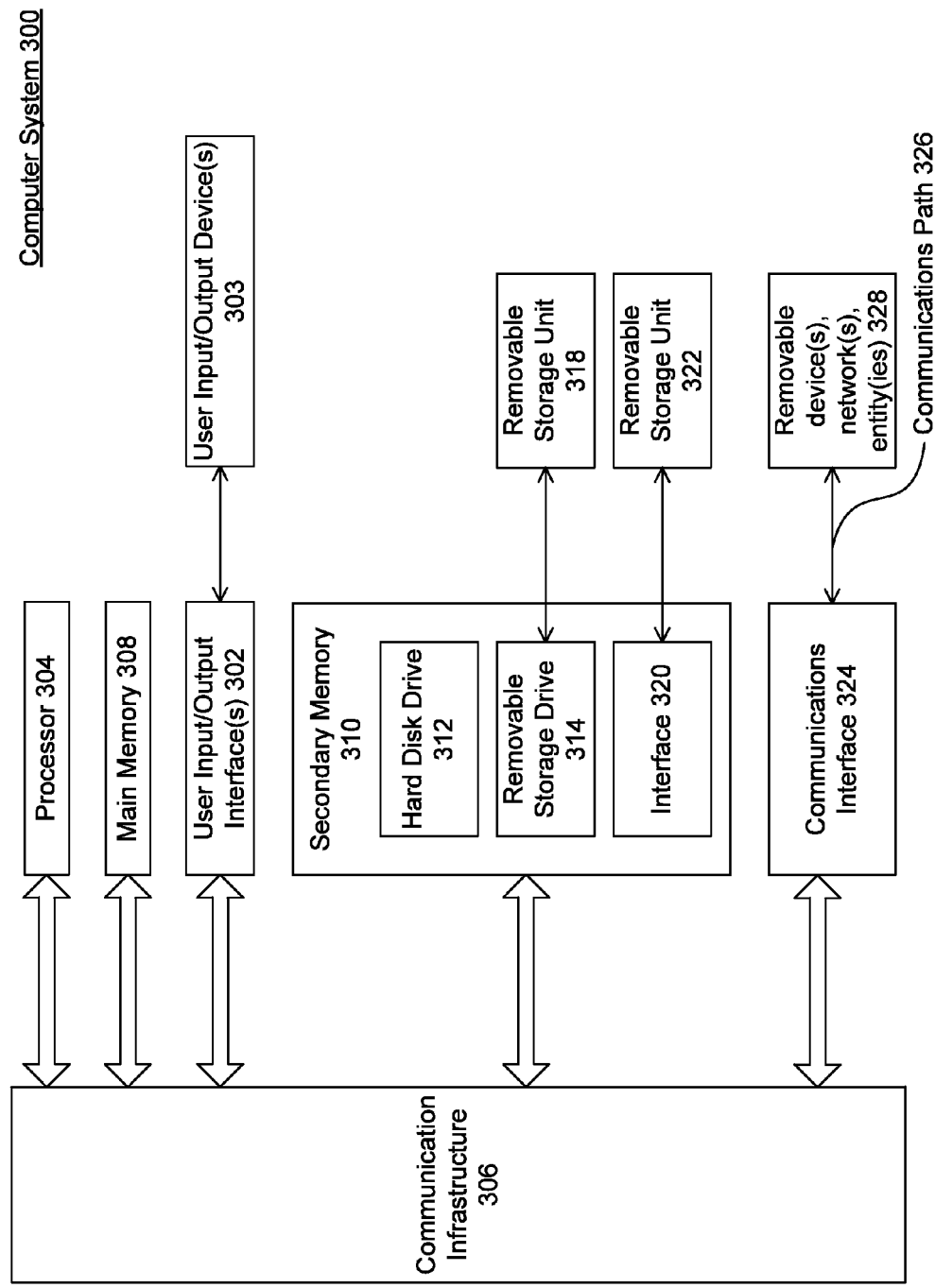
FIG. 3 is an example computer system useful for implementing various embodiments.

FIG. 3 is an example computer system 300 useful for implementing various embodiments. Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
   receiving a request to load data from a storage device into an in-memory database, wherein the in-memory database is distributed across a plurality of nodes, each node comprising a local memory;
   determining, by at least one processor, a preferred one of the plurality of nodes onto which to load the data from the storage device based on a bitmap indicating the preferred node based on a workload of the plurality of nodes and a relative distance from a client;
   determining whether the preferred node has sufficient free local memory in a free list to store the data, wherein if the preferred node does not have sufficient free list memory:
      requesting an allocation of heap memory to be allocated to the preferred node,
      storing the data in the requested heap memory, and
      binding the requested heap memory storing the data to the preferred node; and
      providing, responsive to the request, an address of the allocated heap memory by which the data is accessed;
   wherein at least one of the receiving, determining the preferred node, determining whether the preferred node has sufficient free memory, and providing are performed by one or more computers.

2. The method of claim 1, wherein the concurrency of threads comprises non-uniform memory access to the local memory of the plurality of nodes by the threads, wherein a first local memory of a first node of the plurality of nodes is accessed more frequently by the threads than a second local memory of a second node of the plurality of nodes.

3. The method of claim 1, wherein the determining a preferred one of the plurality of nodes, comprises determining a secondary node onto which to load the data from the disk in case the preferred node is unavailable.

4. The method of claim 1, wherein the free list comprises a portion of local memory allocated prior to the determining for storing the data.

5. The method of claim 3, wherein the bitmap indicates both the preferred node and the secondary node.

6. The method of claim 1, further comprising:
   determining that the free list of the preferred node does not have sufficient free memory to store the data;

determining whether the local memory of the preferred node outside the free list has sufficient free local memory to store the data;
allocating a portion of the local memory of the preferred node outside the free list to the free list memory of the preferred node; and
storing the data in the allocated portion of local memory of the preferred node.

7. The method of claim 1, wherein the allocation of heap memory is requested from an operating system memory heap which is distinguishable from borrowing memory from nodes from the plurality of nodes.

8. The method of claim 1, wherein the binding occurs when a client requests access to the data stored at the address of the allocated heap memory.

9. The method of claim 1, further comprising:
storing the data in the memory of the preferred node if the preferred node has sufficient free local memory.

10. A system, comprising:
a memory; and
at least one processor coupled to the memory and configured to:
receive a request to load data from a storage device into an in-memory database, wherein the in-memory database is distributed across a plurality of nodes, each node comprising a local memory;
determine, by at least one processor, a preferred one of the plurality of nodes onto which to load the data from the storage device based on a bitmap indicating the preferred node based on a workload of the plurality of nodes and a relative distance from a client;
determine whether the optimal node has sufficient free local memory in a free list to store the data, wherein if the preferred node does not have sufficient free list memory:
request an allocation of heap memory to be allocated to the preferred node,
store the data in the requested heap memory, and
bind the requested heap memory storing the data to the preferred node; and
provide, responsive to the request, an address of the allocated heap memory by which the data is accessed.

11. The system of claim 10, wherein the concurrency of threads comprises non uniform memory access to the local memory of the plurality of nodes by the threads, wherein a first local memory of a first node of the plurality of nodes is accessed more frequently by the threads than a second local memory of a second node of the plurality of nodes.

12. The system of claim 10, wherein the processor configured to determine a preferred one of the plurality of nodes, is configured to determine a secondary node onto which to load the data from the disk in case the preferred node is unavailable.

13. The system of claim 12, wherein the bitmap indicates both the preferred node and the secondary node.

14. The system of claim 10, wherein the processor is further configured to:
determine that the free list of the preferred node does not have sufficient free memory to store the data;
determine whether the local memory of the preferred node outside the free list has sufficient free local memory to store the data;
allocate a portion of the local memory of the preferred node outside the free list to the free list memory of the preferred node; and
store the data in the allocated portion of local memory of the preferred node.

15. The system of claim 10, wherein the allocation of heap memory is requested from an operating system.

16. The system of claim 10, wherein the binding occurs when a client requests access to the data stored at the address of the allocated heap memory.

17. The system of claim 10, wherein the free list comprises a portion of local memory allocated prior to the determining for storing the data.

18. A tangible computer-readable device having instructions stored thereon that, when executed by at least one computing device, causes the at least one computing device to perform operations comprising:
receiving a request to load data from a disk into an in-memory database, wherein the in-memory database is distributed across a plurality of nodes, each node comprising a local memory;
determining, by at least one processor, a preferred one of the plurality of nodes onto which to load the data from the storage device based on a bitmap indicating the preferred node based on a workload of the plurality of nodes and a relative distance from a client;
determining whether the preferred node has sufficient free local memo store the data, wherein if the preferred node does not have sufficient free local memory:
requesting an allocation of heap memory to be allocated to the preferred node,
storing the data in the requested heap memory, and
binding the requested heap memory storing the data to the preferred node; and
providing, responsive to the request, an address of the allocated heap memory by which the data is accessed.

19. The method of claim 7, wherein the requesting an allocation of heap memory comprises:
requesting the allocation of heap memory from the operating system heap memory based on a determination that there is insufficient memory remaining on the at least a subset of the plurality of nodes to process the request.

* * * * *